United States Patent
Chung et al.

(10) Patent No.: US 8,039,989 B2
(45) Date of Patent: Oct. 18, 2011

(54) APPARATUS, SYSTEM, AND METHOD FOR A LOW COST MULTIPLE OUTPUT REDUNDANT POWER SUPPLY

(75) Inventors: Chu T. Chung, Cary, NC (US); Cecil C. Dishman, Raleigh, NC (US); Randhir S. Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 11/945,858

(22) Filed: Nov. 27, 2007

(65) Prior Publication Data

US 2009/0134703 A1    May 28, 2009

(51) Int. Cl.
*H02J 7/00* (2006.01)
*H02J 9/00* (2006.01)

(52) U.S. Cl. .............. 307/64; 307/82; 363/65; 363/131

(58) Field of Classification Search ............... 307/64, 307/82
See application file for complete search history.

(56) References Cited

U.S. PATENT DOCUMENTS

| | | | | |
|---|---|---|---|---|
| 3,740,569 A * | 6/1973 | Carcia | .............. | 307/11 |
| 4,065,711 A | 12/1977 | Kawabata | .............. | 320/14 |
| 4,074,182 A | 2/1978 | Weischedel | .............. | 323/25 |
| 4,766,364 A | 8/1988 | Biamonte et al. | .............. | 323/272 |
| 5,635,825 A * | 6/1997 | Lesea | .............. | 323/299 |
| 5,723,972 A | 3/1998 | Bartol et al. | .............. | 322/15 |
| 5,737,202 A * | 4/1998 | Shimamori | .............. | 363/65 |
| 5,917,250 A * | 6/1999 | Kakalec et al. | .............. | 307/18 |
| 5,966,299 A | 10/1999 | Rhew et al. | .............. | 363/124 |
| 5,999,417 A * | 12/1999 | Schlecht | .............. | 363/16 |
| 6,064,122 A | 5/2000 | McConnell | .............. | 290/32 |
| 6,288,456 B1 * | 9/2001 | Cratty | .............. | 307/64 |
| 6,396,167 B1 | 5/2002 | Simburger et al. | .............. | 307/43 |
| 6,611,068 B2 * | 8/2003 | Cratty | .............. | 307/64 |
| 6,950,323 B2 * | 9/2005 | Achleitner et al. | .............. | 363/55 |
| 7,116,009 B2 * | 10/2006 | Tamai et al. | .............. | 307/10.7 |
| 7,474,016 B2 * | 1/2009 | Wang et al. | .............. | 307/45 |
| 2003/0025396 A1 * | 2/2003 | Shen et al. | .............. | 307/64 |
| 2003/0076084 A1 * | 4/2003 | Elbanhawy | .............. | 324/72 |
| 2003/0095422 A1 * | 5/2003 | Nagaki et al. | .............. | 363/65 |
| 2004/0041473 A1 * | 3/2004 | Deguchi | .............. | 307/82 |
| 2006/0125417 A1 * | 6/2006 | Mosebrook et al. | .............. | 315/291 |
| 2007/0013321 A1 * | 1/2007 | Ito et al. | .............. | 315/247 |

* cited by examiner

*Primary Examiner* — Rexford Barnie
*Assistant Examiner* — Justen Fauth
(74) *Attorney, Agent, or Firm* — Kunzler Needham Massey & Thorpe

(57) ABSTRACT

An apparatus, system, and method are disclosed for a low cost multiple output redundant power supply. Disclosed is a power supply that includes a primary stage for regulating voltage on an internal bus. The power supply includes a first regulator stage and a second regulator stage connected to the internal bus. The first regulator stage regulates voltage on a bus configured to connect to a first system. The second regulator stage regulates voltage on a bus configured to connect to a second system. The each regulator stage continues to operate in the event the other regulator stage is not operating. A disconnecting means is connected between the primary stage and the each regulator stage for isolating the failed regulator stage from the other regulator stage and the primary stage.

20 Claims, 5 Drawing Sheets

APPARATUS, SYSTEM, AND METHOD FOR A LOW COST MULTIPLE OUTPUT REDUNDANT POWER SUPPLY

BACKGROUND OF THE INVENTION

1. Field of the Invention

This invention relates to power supplies, and more particularly relates to implementing a low cost multiple output redundant power supply.

2. Description of the Related Art

A power supply, sometimes known as a power supply unit or PSU, is a device or system that supplies electrical or other types of energy to an output load or group of loads. A power supply, in some embodiments may be configured to convert power in one form to another form, such as converting AC power to DC power. The regulation of power supplies is typically done by incorporating circuitry to tightly control the output voltage and/or current of the power supply to a specific value. The specific value is closely maintained despite variations in the load presented to the power supply's output, or any reasonable voltage variation at the power supply's input.

For example, in an electrical device such as a computer, the power supply is typically designed to convert an AC voltage input such as is traditionally provided by a conventional wall socket, into several low-voltage DC power outputs for transmission to the internal components of the computer. Conversion is typically performed in stages that may include various different stages such as a rectification stage, an active filter stage, a regulator stage, etc. The various stages may be a boost, a buck, or other derivative topology. In one embodiment of a conventional power supply, a regulator stage may be implemented to provide a number of different voltages to a computer system via a bus. For example, the power supply may include a regulator stage that regulates voltages on the bus of +12 volts, +5 volts, +3.3 volts, and −12 volts. These regulated voltages are then provided to the computer system which uses the different voltages to power the various electrical sub-systems of the computer system.

For high availability systems, often two or more redundant systems are provided so that a single failure will not cause the system to be unavailable. The high availability system may have two distinct systems or may include two or more sub-systems. In either case, the systems require regulated power at various voltages. One solution to provide power is to provide two or more separate power supplies. This solution has an advantage of being very reliable, since if any one power supply fails, the other can pick up the load of the failed power supply. However, in normal operation each power supply provides power only up to 50% of the load. As more power supplies are added, the amount of power provided by each power supply is further reduced. Typically, power supplies operate most efficiently near full load and efficiency degrades rapidly below around 50%. Providing two fully redundant power supplies where each is usually operating below 50% is inefficient. In addition, providing two separate power supplies is relatively expensive compared to a single power supply.

Another solution is a single power supply that provides power to multiple systems. In such an implementation, efficiency is usually high because the single power supply typically operates closer to full load. However, reliability is low because a single failure in the single power supply will make power to the systems unavailable. The single power supply solution is less expensive than providing two power supplies.

Thus, there is a need for a low cost multiple output power supply that can efficiently provide power to two or more systems while providing protection for those systems in the event of a regulator stage component failure.

SUMMARY OF THE INVENTION

From the foregoing discussion, it should be apparent that a need exists for an apparatus, system, and method that provide low cost redundant regulator stages in a power supply for providing power to multiple systems. Beneficially, such an apparatus, system, and method would reduce the cost of building a power supply that can deliver high amounts of power while also providing redundancy protection in the event of a failure of one of the regulator stages.

The present invention has been developed in response to the present state of the art, and in particular, in response to the problems and needs in the art that have not yet been fully solved by currently available power supplies.

The apparatus is provided as a power supply to regulate voltage and includes a primary stage that regulates voltage on an internal bus. The power supply also includes a first regulator stage connected to the internal bus to receive input power from the primary stage. The first regulator stage regulates voltage on a bus configured to connect to a first system. The power supply also includes a second regulator stage connected to the internal bus to receive input power from the primary stage, and the second regulator stage regulates voltage on a bus configured to connect to a second system.

The first regulator stage continues to operate in the event the second regulator stage is not operating and the second regulator stage continues to operate in the event the first regulator stage is not operating. A first disconnecting means is connected between the primary stage and the first regulator stage for isolating the first regulator stage from the second regulator stage and the primary stage in response to a failure of the first regulator stage, and a second disconnecting means is connected between the primary stage and the second regulator stage for isolating the second regulator stage from the first regulator stage and the primary stage in response to a failure of the second regulator stage.

In one embodiment, the first disconnecting means comprises a first fuse and the second disconnecting means comprises a second fuse. In a further embodiment, the first disconnecting means may include a first failure detection module that detects a failure in the first regulator stage and isolates the first regulator stage in response to detecting the failure of the first regulator stage. The second disconnecting means may include a second failure detection module that detects a failure in the second regulator stage and isolates the second regulator stage in response to detecting the failure of the second regulator stage.

In a further embodiment, the power supply includes one or more additional regulator stages connected to the internal bus to receive input power from the primary stage, and the one or more additional regulator stages regulate voltage on one or more additional buses connected to at least one of the first system, the second system, and one or more additional systems. In such an embodiment, one or more additional disconnecting means may be connected between the primary stage and the one or more additional regulator stages for isolating one of the one or more additional regulator stages from the primary stage and other regulator stages in response to a respective failure of one of the one or more additional regulator stages.

In various embodiments of the power supply, the first and second systems that are connected to the first and second regulator stages may be computer systems. In other embodiments, the first and second systems may be electrical devices or a combination of electrical devices and computer systems.

In one embodiment, the power supply may further include an input filter that rectifies an alternating current ("AC") input voltage and filters out harmonic content. In a further embodiment, the input filter and the corresponding primary stage of the power supply comprise an active harmonic filter that provides approximately unity power factor correction and harmonic filtering.

In yet another embodiment, the power supply may include an auxiliary stage configured to receive regulated voltage as an input from the primary stage and output a regulated auxiliary voltage to the first system and the second system such that the first system and the second system receive auxiliary power independent of the first and second regulator stages.

A system and method of the present invention are also presented. The system and method in the disclosed embodiments substantially include the steps necessary to carry out the functions presented above with respect to the operation of the described apparatus. The system includes a first system comprising an electrical load and a second system comprising an electrical load. The system also includes a power supply as described above with regard to the apparatus. The first and second regulator stages of the power supply receive input power from the primary stage of the power supply and regulate voltage on buses connected to the first and second computer systems respectively.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
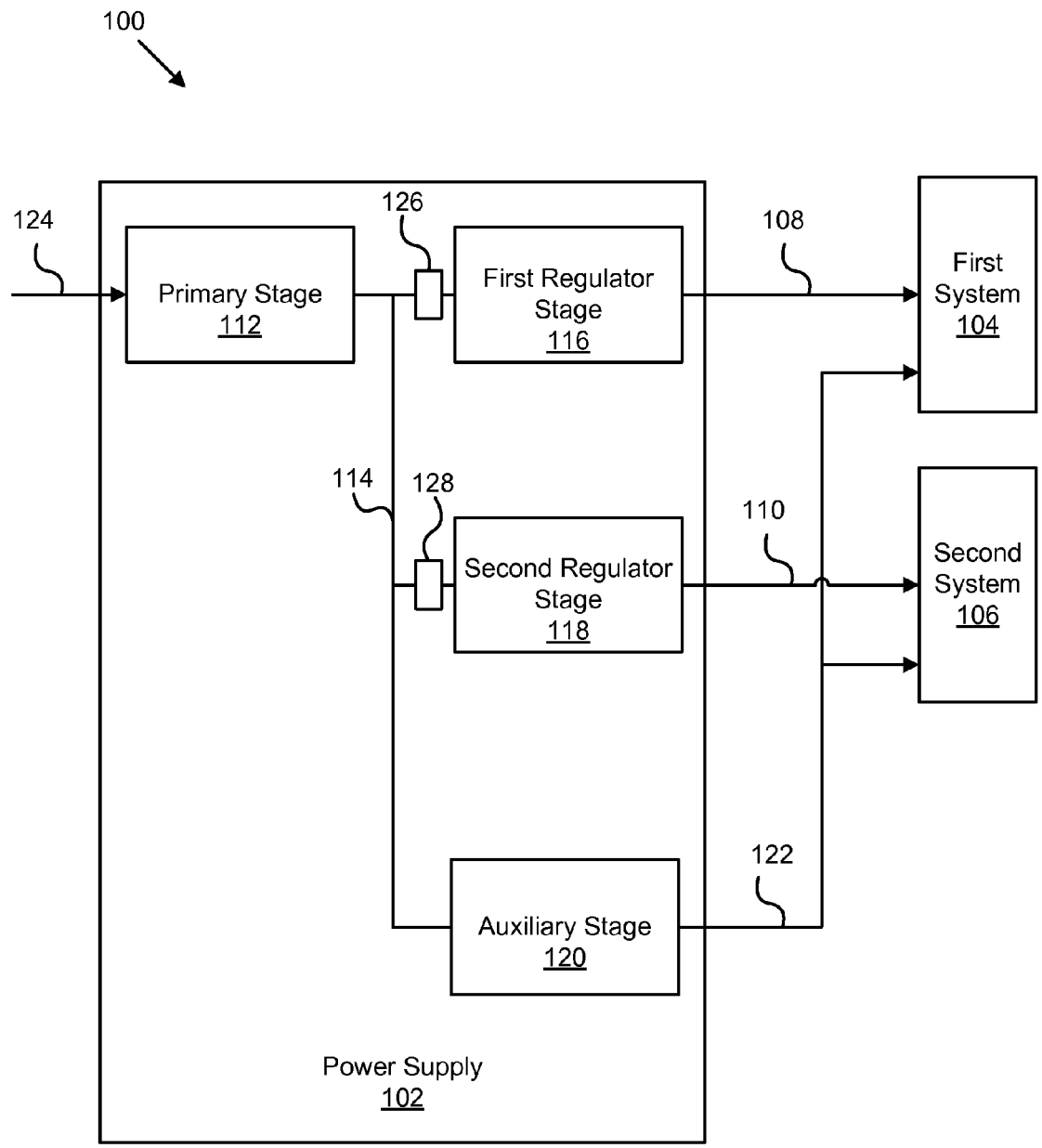
FIG. 1 is a schematic block diagram illustrating one embodiment of a low cost multiple output redundant power system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a low cost multiple output redundant power system 100 in accordance with the present invention. The system 100 includes a power supply 102 for regulating voltage that provides power to a first system 104 and a second system 106. The power supply 102 is connected to the first system 104 by a first regulated voltage bus 108 and is connected to the second system 106 by a second regulated voltage bus 110. In further embodiments, the power supply 102 may be configured to provide power to one or more additional systems such as a third system and a fourth system. (See FIG. 4).

The power supply 102 includes a primary stage 112 that regulates voltage on an internal bus 114, a first regulator stage 116 that regulates one or more voltages on the first regulated voltage bus 108, a second regulator stage 118 that regulates one or more voltages on the second regulated voltage bus 110, and an auxiliary stage 120 that regulates voltages on an auxiliary power bus 122. The power supply 102 is preferably a switching power supply and may include various additional stages and components such as filter stages, transformers, inverter stages, or other power configuration stages that are recognized by one of skill in the art. For example, in one embodiment, the power supply 102 may include an input filter that rectifies an alternating current ("AC") input voltage and filters out harmonic content. In a further embodiment, the input filter and the corresponding primary stage 112 of the power supply 102 may be configured as an active harmonic filter that provides approximately unity power factor correction and harmonic filtering.

In one embodiment, the primary stage 112 receives an input voltage 124 as an input. The input voltage 124 is preferably an alternating current ("AC") voltage such as that provided by a common 110 volt or 220 volt wall outlet. In various embodiments, the input voltage 124 may be provided to the power supply 102 by different supply means such as through a power cord or a rack system. In some embodiments, the input voltage 124 is a direct current ("DC") voltage. The DC voltage, in one embodiment, is provided by an external power inverter that converts AC power into DC power.

The primary stage 112 provides as an output one or more regulated voltages on the internal bus 114. For example, the primary stage 112 regulates the voltage on the internal bus 114 to about 400 volts. The internal bus 114 typically delivers the regulated voltage to the first regulator stage 116, the second regulator stage 118, and may also provide regulated voltage for the auxiliary stage 120 if present. In some embodiments, the regulated voltage on the internal bus 114 may be modified or adjusted by a feedback loop or logic circuit.

In one embodiment, the primary stage 112 may be implemented as a boost stage, or a similar boost-type topology, for regulating the voltage on the internal bus 114 to a voltage greater than the input voltage 124. In an alternate embodiment, the primary stage 112 may be implemented as a buck stage, or similar buck-type topology, for regulating the voltage on the internal bus 114 to a voltage less than the input voltage 124 provided to the primary stage 112. As may be recognized by one of skill in the art, the primary stage 112 may be a buck-type stage or may also include a combination of boost stages and buck stages for regulating the voltage on the internal bus 114.

The first regulator stage 116 of the power supply 102 is connected to the internal bus 114 and receives input power through the internal bus 114 from the primary stage 112. The first regulator stage 116 acts as a "regulator" or "chopper" and regulates one or more voltages on the power bus 108 that is connected to and supplies power to the first system 104. For example, the first regulator stage 112 may receive as an input voltage on the internal bus 114 a voltage of about 400 volts. The first regulator stage 112 operates to convert or regulate the 400 volt input into one or more different supply voltages on the regulated voltage bus 108. In one embodiment, the first regulator stage 112 may provide a single 12 volt output, and in a further embodiment, the first regulator stage 112 may provide numerous output voltages such as +12 volts, +5 volts, +3.3 volts, and −12 volts which are commonly used in electronic devices and computer systems.

The second regulator stage 118 of the power supply 102 operates similarly to the first regulator stage 116, and preferably operates as a redundant implementation of the first regulator stage 116. Like the first regulator stage 116, the second regulator stage 118 is connected to the internal bus 114 and receives input power through the internal bus 114 from the primary stage 112. However, the second regulator stage 118 regulates voltages on a second regulated voltage bus 110 to supply power to the second system 106. In at least one embodiment, the second regulator stage 118 provides the same voltage levels as does the first regulator stage 116. For example, if the first regulator stage 116 provides voltages of +12 volts, +5 volts, +3.3 volts, and −12 volts, the second regulator stage 118 also provides voltages of +12 volts, +5 volts, +3.3 volts, and −12 volts.

By utilizing a common primary stage 112 along with a first regulator stage 116 and a second regulator stage 118 to provide power to a first system 104 and a second system 106 respectively, rather than utilizing two power supplies to power multiple systems 104, 106, the power supply 102 is less expensive to build and operate. This is because the primary stage 112 typically operates close to full load and therefore operates relatively efficient. The power supply 102 may also be fault tolerant as will be explained below.

Furthermore, because the output voltages from the first regulator stage 116 and the second regulator stage 118 are mutually exclusive, that is they operate independent of one another, a failure in the first regulator stage 116 does not affect the operation of the second regulator stage 118. Thus, the first regulator stage 116 continues to operate in the event the second regulator stage 118 is not operating, and the second regulator stage 118 continues to operate in the event the first regulator stage 116 is not operating. Such an implementation allows the first system 104 to continue receiving power if the second regulator stage 118 fails and allows the second system 106 to continue receiving power if the first regulator stage 116 fails.

To help isolate the first regulator stage 116 and first system 104 from the second regulator stage 118 and second system 106 in the event of a short circuit-type failure of the first regulator stage 116, the power supply 102 includes a first disconnecting means 126 connected between the primary stage 112 and the first regulator stage 116. Likewise, a second disconnecting means 128 is provided to similarly isolate the second regulator stage 118 and second system 106 in the event of a failure of the second regulator stage 118.

Preferably, the first and second disconnecting means 126, 128 are fuses that break the connection between a failed regulator stage 116, 118 and the internal bus 114 in response to an unacceptable amount of current passing through the fuse. For example, if a short occurs in the second regulator stage 118, then the disconnecting means 128 will detect the failure and immediately break the connection between the second regulator stage 118 and the internal bus 114 such that the failure is not propagated to the primary stage 112 or the first regulator stage 116. In an alternate embodiment, the first and second disconnecting means 126, 128 may include logic modules and/or switches for detecting a fault in one of the regulator stages 116, 118 and subsequently disconnecting the faulty regulator stage 116, 118 as is described below with regard to FIG. 2. In yet another alternate embodiment, the first and second disconnecting means 126, 128 may implemented as circuit breakers.

The power supply 102, in some embodiments, includes an auxiliary stage 120 for providing auxiliary power to the first and second systems 104, 106 via a power bus 122. The auxiliary stage 120 is configured to receive regulated voltage as an input from the primary stage 112 via the internal bus 114 and output a regulated auxiliary voltage to the first system 104 and the second system 106 such that the first system 104 and the second system 106 receive auxiliary power independent of the first and second regulator stages 116, 118. In a typical system 100, the auxiliary stage 120 provides a 5 volt power supply to power the systems 104, 106 to provide an alternate source of power for some system components, such as the system clock, in the event that the main power supply is interrupted. In a further embodiment, the power supply 102 may include a first auxiliary stage and a second auxiliary stage (not pictured) to provide additional redundancy protection similar to that described about with regard to the first and second regulator stages 116, 118. The same is true for the primary stage 112.

However, because the primary stage 112 and the auxiliary stage 120 typically have a much lower failure rate than the regulator stages 116, 118, it is preferable to lower costs by utilizing a single auxiliary stage 120 and a single primary stage 112 in conjunction with the first and second regulator stages 116, 118. Furthermore, in additional embodiments, the auxiliary stage 120, or stages, may also be implemented with a disconnecting means for isolating the auxiliary stage 120 from the primary stage 112 and the regulator stages 116, 118 in the event of a failure.

Figure 2:
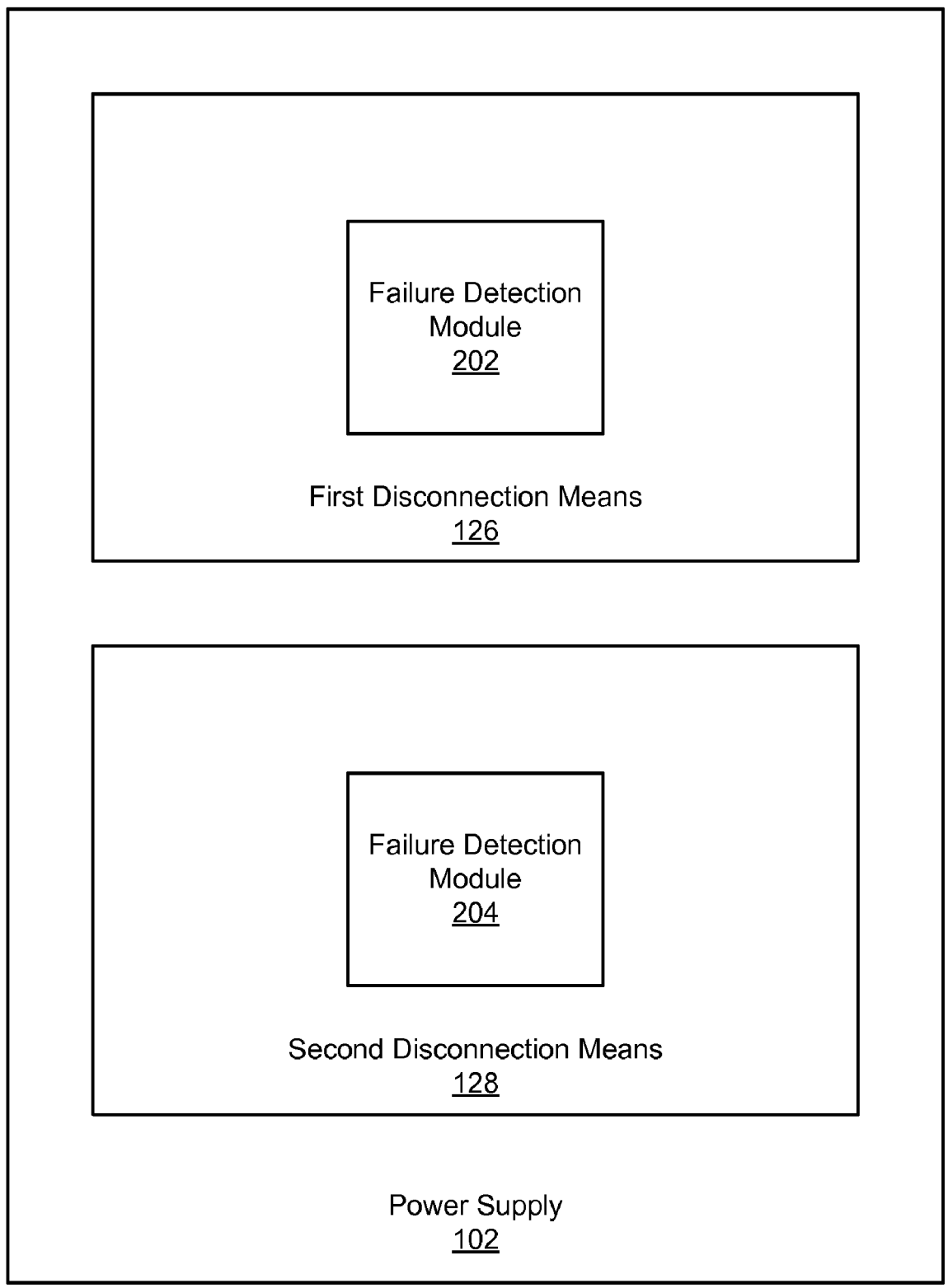
FIG. 2 is a schematic block diagram illustrating one embodiment of a power supply with a plurality of modules for operating a low cost multiple output redundant power system.

FIG. 2 is a schematic block diagram illustrating one embodiment of a power supply 102 with a plurality of modules 202 for operating a low cost multiple output redundant power system 100. The power supply 102 includes a first disconnecting means 126 and a second disconnecting means 128. As described above, the first and second disconnecting means 126, 128 are preferably implemented as fuses. However, in some embodiments, the first and second disconnecting means 126 may include a first failure detection module 202 that detects a failure in the first regulator stage 116 and isolates the first regulator stage 116 in response to detecting the failure of the first regulator stage 116. Similarly, the second disconnecting means 128 may include a second failure detection module 204 that detects a failure in the second regulator stage 118 and isolates the first regulator stage 116 in response to detecting the failure of the second regulator stage 118.

For example, in one embodiment, the first failure detection module 202 may be configured to detect a fault in the first regulator module 116 such as a sudden drop or increase in power consumption above an acceptable threshold. In response to detecting a fault, the first failure detection module 202 may activate a switch connecting between the first regulator stage 116 and the internal bus 114 in order to isolate the first regulator stage 116 and first system 104 from the other system 100 components. In other embodiments, the first failure detection module 202 may be configured to detect other failure indicators such as a sudden drop in voltage on the regulated voltage bus 108 regulated by the first regulator stage 116, an increased current level passing through the first disconnecting means 126 above an acceptable threshold, a sudden increase in voltage on the regulated voltage bus 108 above an acceptable threshold, or other failure indicator recognized by those of skill in the art.

The second failure detection module 204 is preferably configured to operate, with regard to the second regulator stage 118, in a similar manner to the first failure detection module 202 described above. In one embodiment, the first and/or second disconnecting means 126, 128 and associated failure detection module 202, 204 are circuit breakers.

Figure 3:
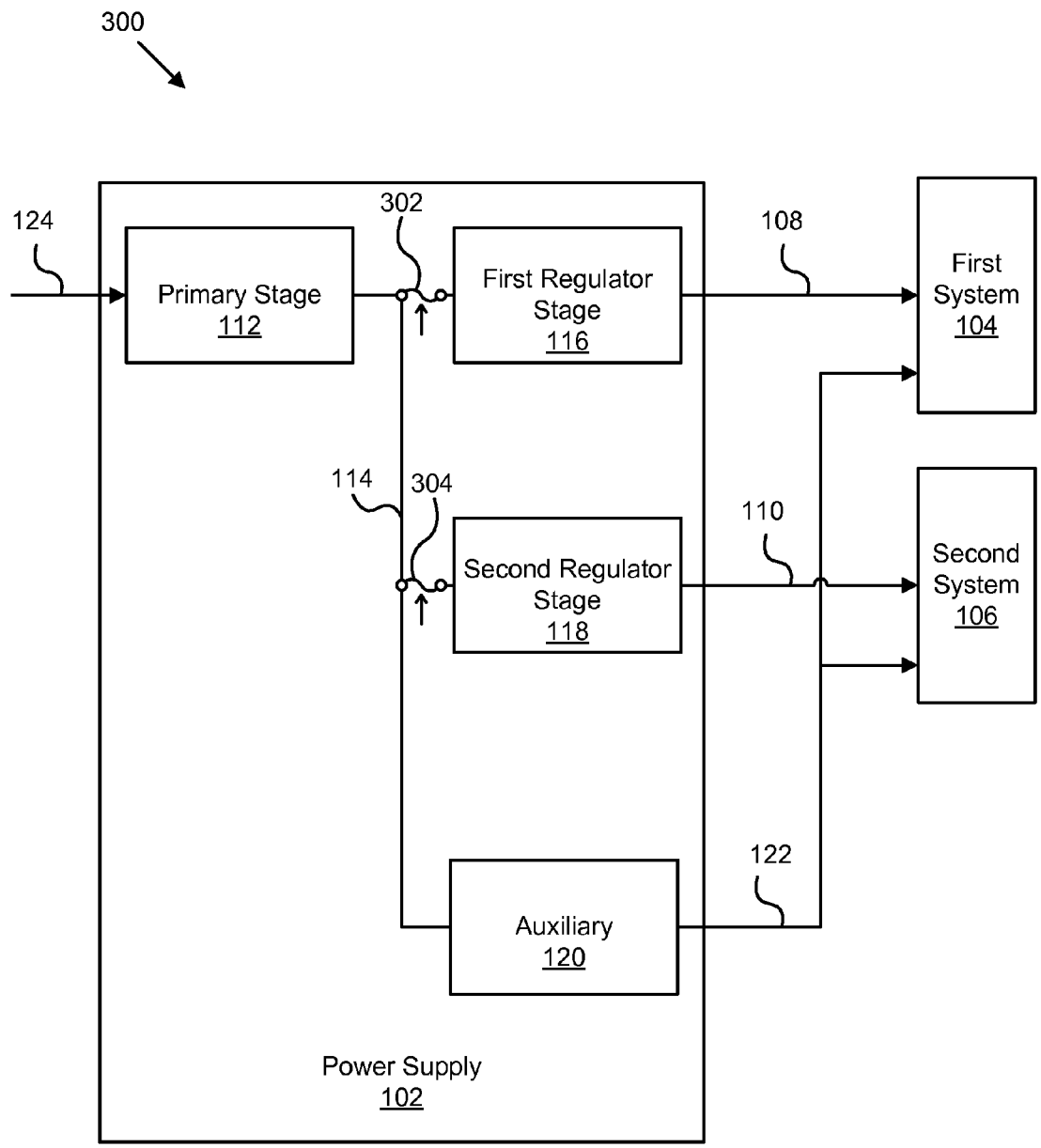
FIG. 3 is a schematic block diagram illustrating another embodiment of a low cost multiple output redundant power system in accordance with the present invention.

FIG. 3 is a schematic block diagram illustrating another embodiment of a low cost multiple output redundant power system 300 in accordance with the present invention. The system 300 is similar to the system 100 except the system 300 depicts the utilization of fuses 302, 304 as the disconnecting means 126, 128. The fuses 302, 304 are over-current protection devices that break a circuit in the event of a short circuit of overload condition. The fuses 302, 304 are implemented to allow an acceptable amount of current to flow to the first and second regulator stages 104, 106, but to 'trip' or disconnect in the event that too much current passes through the fuses 302, 304. The fuses 302, 304 are preferably configured to comply with the voltage requirements necessitated by the regulated voltage on the internal bus 114. For example, if the internal bus 114 carries a voltage of up to 400 volts, then the fuses 302, 304 should have a maximum voltage rating of up to or above 400 volts.

Figure 4:
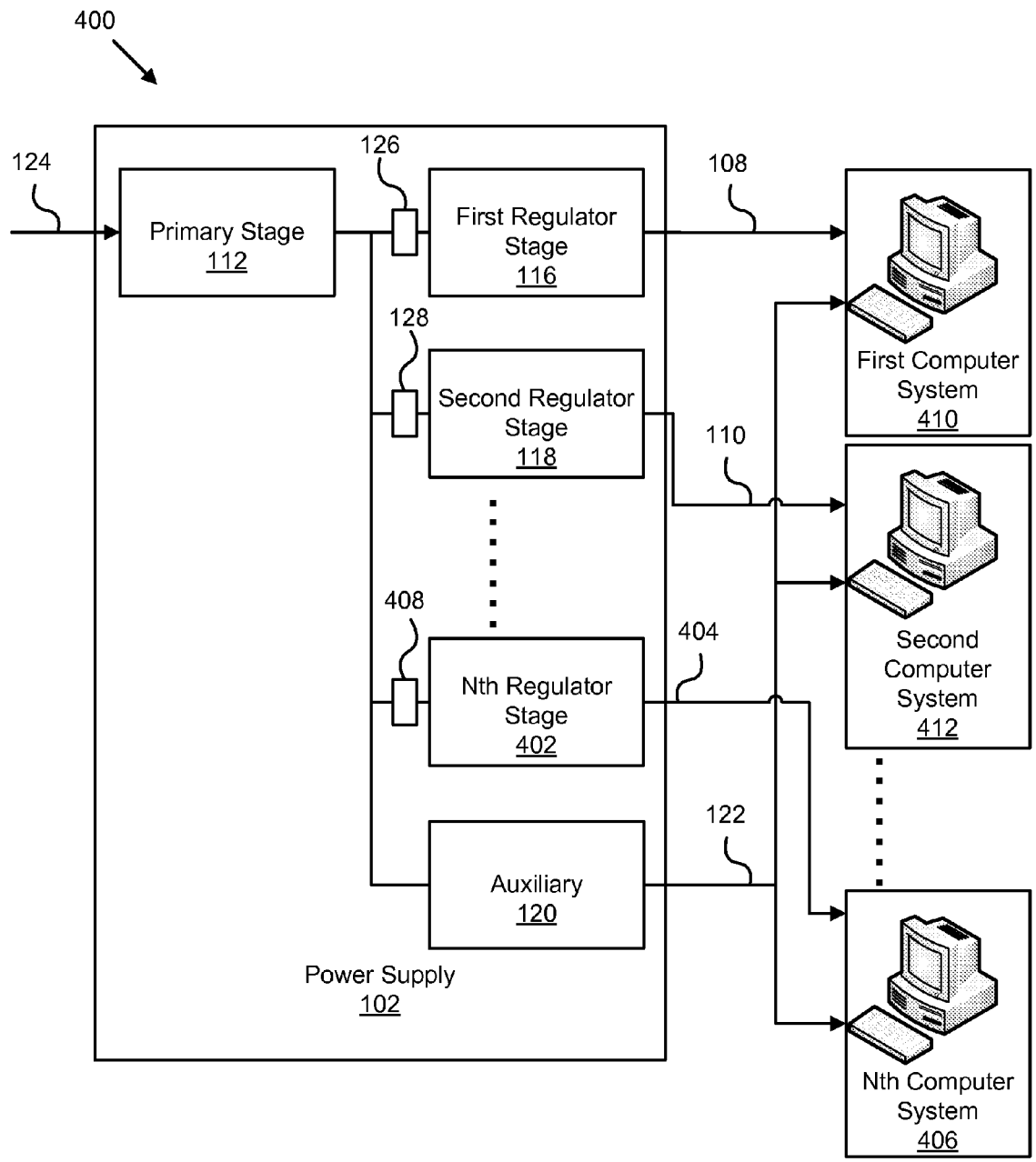
FIG. 4 is a schematic block diagram illustrating another embodiment of a low cost multiple output redundant power system in accordance with the present invention.

FIG. 4 is a schematic block diagram illustrating another embodiment of a low cost multiple output redundant power system 400 in accordance with the present invention. The system 400 includes a power supply 102 that includes one or more additional regulator stages 402 connected to the internal bus 114 that receive input power from the primary stage 112 and regulate voltage on one or more additional buses 404 connected to one or more additional systems 406.

Furthermore, the power supply 102 includes one or more additional disconnecting means 408, connected between the primary stage 112 and the one or more additional regulator stages 402, for isolating one of the one or more additional regulator stages 402 from the primary stage 112 and other regulator stages 116, 118 in response to a failure of one of the additional regulator stages 402. Thus, more than two regulator stages 116, 118, 402 may be provided in a single power supply 102 to provide power to more than two corresponding systems 410, 412, 406.

In the system 400, the first regulator stage 116 provides power to a first computer system 410, the second regulator stage 118 provides power to a second computer system 412, and the Nth regulator stage 402 provides power to an Nth computer system 406. In various embodiments, the computer systems 410, 412 may include a desktop, a laptop, a server, a blade system or other computer system as will be recognized by one of skill in the art. In further embodiments, the systems 104, 106 may include various electrical devices such as a router, a switch, an appliance, etc. or other electrical devices as will be recognized by one of skill in the art. In some embodiments, the systems 104, 106 may include a combination of computer systems 410, 412 and electrical devices. In further embodiments, the first and second systems 104, 106 may be provided as a first and second sub-system within a single computer system 410, 412 or electrical device.

Figure 5:
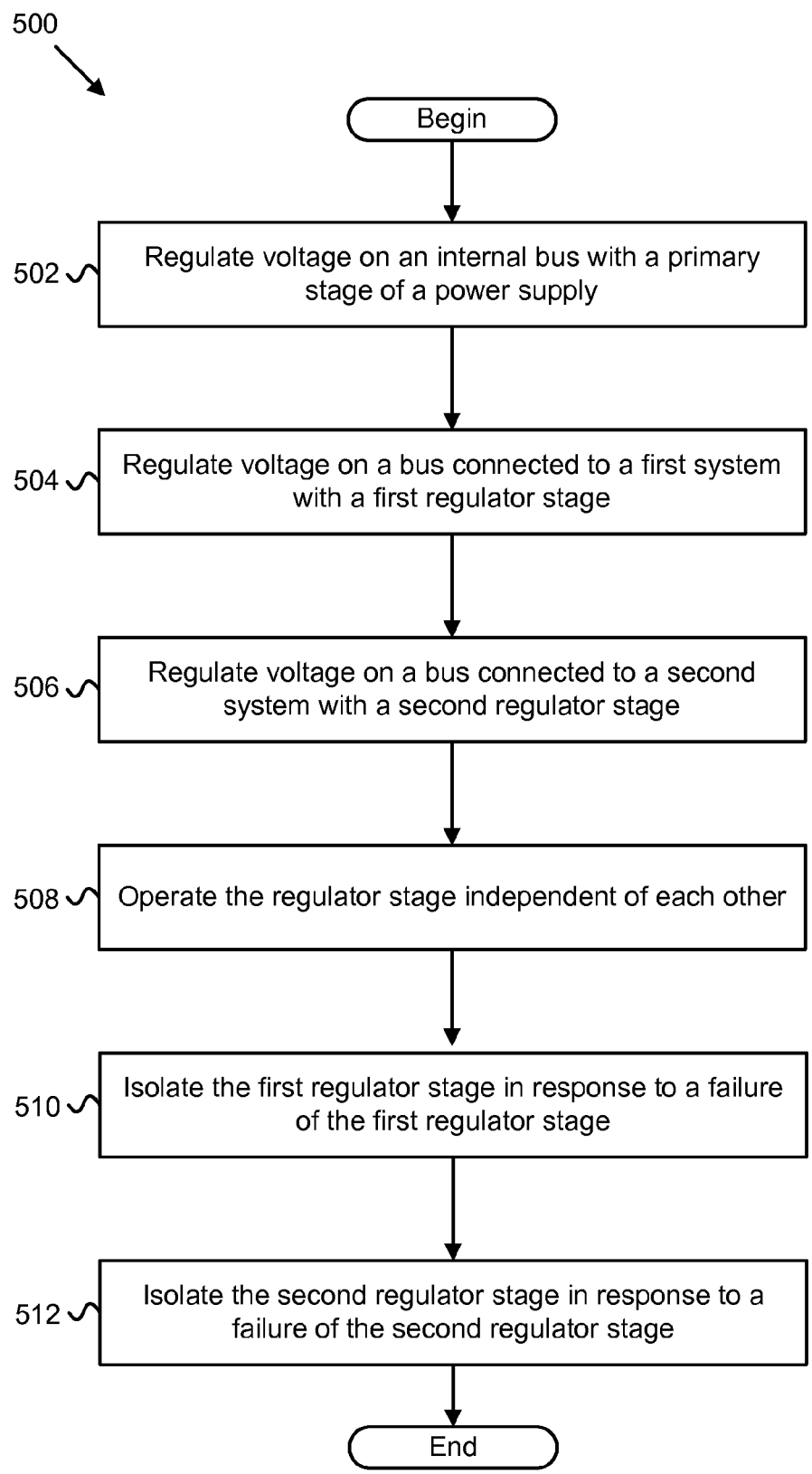
FIG. 5 is a schematic flow chart diagram illustrating one embodiment of a method for operating a low cost multiple output redundant power system in accordance with the present invention.

FIG. 5 is a schematic flow chart diagram illustrating one embodiment of a method 500 for operating a low cost multiple output redundant power system 100, 300, 400 in accordance with the present invention. The method 500 includes substantially the same embodiments described above with regard to the system 100, 300, 400. The method 500 begins when a primary stage 112 in a power supply 102 regulates 502 a voltage on an internal bus 114. The internal bus 114 is connected to a first regulator stage 116 and provides an input voltage to the first regulator stage 116 via the internal bus 114. The first regulator stage 116 regulates 504 one or more voltages on a regulated voltage bus 108 that provides power to a first system 104.

The internal bus 114 is also connected to a second regulator stage 118 and provides an input voltage to the second regulator stage 118 via the internal bus 114. In one embodiment, the second regulator stage 118 is substantially identical to the first regulator stage 116. The second regulator stage 118 regulates 506 one or more voltages on another regulated voltage bus 110 to provide power to a second system 106. In one embodiment, the second regulator stage 118 and the second system 106 are substantially identical to and provide redundancy protection for the first regulator stage 116 and the first system 104.

The first regulator stage 116 continues to operate 508 in the event the second regulator stage 118 is not operating, and the second regulator stage 118 continues to operate 508 in the event the first regulator stage 116 is not operating. Thus, the first and second regulator stages 116, 118 operate 508 independent of one another.

A first disconnecting means 126 is connected between the primary stage 112 and the first regulator stage 116. The first disconnecting means isolates 510 the first regulator stage 116 from the second regulator stage 118 and the primary stage 112 in response to a failure of the first regulator stage 116.

Likewise, a second disconnecting means 128 is connected between the primary stage 112 and the second regulator stage 118. The second disconnecting means 128 isolates 512 the second regulator stage 118 from the first regulator stage 116 and the primary stage 112 in response to a failure of the second regulator stage 118 and the method 500 ends.

In further embodiments of the method 500, more than two regulator stages 116, 118 and more than two disconnecting means 126, 128 may be implemented in the power supply 102 to provide power to more than two systems 104, 106. The method 500 may also be configured to implement the various different embodiments described above with regard to the system 100, 300, 400.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A power supply for regulating voltage, the apparatus comprising:
a primary stage of a power supply that regulates voltage on an internal bus at a controlled output voltage, the primary stage comprising a switching power supply that receives power from a power source, the primary stage maintaining the controlled output voltage on the internal bus over a range of input voltages from the power source;
a first regulator stage of the power supply connected to the internal bus to receive input power from the primary stage wherein the first regulator stage regulates voltage on a bus configured to connect to a first system;
a second regulator stage of the power supply connected to the internal bus to receive input power from the primary stage wherein the second regulator stage regulates voltage on a bus configured to connect to a second system,
wherein the first regulator stage continues to operate in the event the second regulator stage is not operating and the second regulator stage continues to operate in the event the first regulator stage is not operating;
a first disconnecting means connected between an output of the primary stage and an input of the first regulator stage for isolating the first regulator stage from the second regulator stage and isolating the first regulator stage from the primary stage in response to a failure of the first regulator stage; and
a second disconnecting means connected between the output of the primary stage and an input of the second regulator stage for isolating the second regulator stage from the first regulator stage and isolating the second regulator stage from the primary stage in response to a failure of the second regulator stage.

2. The power supply of claim 1, wherein the first disconnecting means comprises a first fuse and wherein the second disconnecting means comprises a second fuse.

3. The power supply of claim 1, wherein the first disconnecting means comprises a first failure detection module that detects a failure in the first regulator stage and isolates the first regulator stage in response to detecting the failure of the first regulator stage and wherein the second disconnecting means comprises a second failure detection module that detects a failure in the second regulator stage and isolates the second regulator stage in response to detecting the failure of the second regulator stage.

4. The power supply of claim 1, further comprising one or more additional regulator stages of the power supply connected to the internal bus to receive input power from the primary stage wherein the one or more additional regulator stages regulate voltage on one or more additional buses connected to at least one of the first system, the second system, and one or more additional systems.

5. The power supply of claim 4, further comprising one or more additional disconnecting means connected between the primary stage and the one or more additional regulator stages for isolating one of the one or more additional regulator stages from the primary stage and other regulator stages in response to a respective failure of one of the one or more additional regulator stages.

6. The power supply of claim 1, wherein the first system is a first computer system.

7. The power supply of claim 6, wherein the second system is a second computer system.

8. The power supply of claim 1, wherein the first system is a first electronic device.

9. The power supply of claim 8, wherein the second system is a second electronic device.

10. The power supply of claim 1, wherein the first system comprises a first subsystem of a computer system and wherein the second system comprises a second subsystem of the computer system.

11. The power supply of claim 1, further comprising an input filter that rectifies an alternating current ("AC") input voltage and filters out harmonic content.

12. The power supply of claim 11, wherein the input filter and the corresponding primary stage of the power supply comprise an active harmonic filter that provides approximately unity power factor correction and harmonic filtering.

13. The power supply of claim 1, further comprising an auxiliary stage configured to receive regulated voltage as an input from the primary stage and output a regulated auxiliary voltage to the first system and the second system such that the first system and the second system receive auxiliary power independent of the first and second regulator stages.

14. A power supply comprising:
a primary stage of a power supply that regulates voltage on an internal bus at a controlled output voltage, the primary stage comprising a switching power supply that receives power from a power source, the primary stage maintaining the controlled output voltage on the internal bus over a range of input voltages from the power source;
a first regulator stage of the power supply connected to the internal bus to receive input power from the primary stage wherein the first regulator stage regulates voltage on a bus configured to connect to a first system;
a second regulator stage of the power supply connected to the internal bus to receive input power from the primary stage wherein the second regulator stage regulates voltage on a bus configured to connect to a second system,
wherein the first regulator stage continues to operate in the event the second regulator stage is not operating and the second regulator stage continues to operate in the event the first regulator stage is not operating;
a first fuse connected between an output of the primary stage and an input of the first regulator stage for isolating the first regulator stage from the second regulator stage and isolating the first regulator stage from the primary stage in response to a failure of the first regulator stage; and
a second fuse connected between the output of the primary stage and an input of the second regulator stage for isolating the second regulator stage from the first regulator stage and isolating the second regulator stage from the primary stage in response to a failure of the second regulator stage.

15. The power supply of claim 14, further comprising one or more additional regulator stages of the power supply connected to the internal bus to receive input power from the primary stage wherein the one or more additional regulator stages regulate voltage on one or more additional buses connected to one or more additional systems.

16. The power supply of claim 14, further comprising one or more additional fuses connected between the primary stage and the one or more additional regulator stages for isolating one of the one or more additional regulator stages from the primary stage and other regulator stages in response to a respective failure of one of the one or more additional regulator stages.

17. A system comprising:
a first system comprising an electrical load;
a second system comprising and electrical load; and
a power supply that supplies power to the first and second systems, the power supply comprising:
a primary stage of a power supply that regulates voltage on an internal bus at a controlled output voltage, the primary stage comprising a switching power supply that receives power from a power source, the primary stage maintaining the controlled output voltage on the internal bus over a range of input voltages from the power source;
a first regulator stage of the power supply connected to the internal bus to receive input power from the primary stage wherein the first regulator stage regulates voltage on a bus connected to the first system;
a second regulator stage of the power supply connected to the internal bus to receive input power from the primary stage wherein the second regulator stage regulates voltage on a bus connected to the second system,
wherein the first regulator stage continues to operate in the event the second regulator stage is not operating and the second regulator stage continues to operate in the event the first regulator stage is not operating;
a first disconnecting means connected between an output of the primary stage and an input of the first regulator stage for isolating the first regulator stage from the second regulator stage and isolating the first regulator stage from the primary stage in response to a failure of the first regulator stage; and
a second disconnecting means connected between the output of the primary stage and an input of the second regulator stage for isolating the second regulator stage from the first regulator stage and isolating the second regulator stage from the primary stage in response to a failure of the second regulator stage.

18. The system of claim 17, wherein the wherein the first disconnecting means comprises a first fuse and wherein the second disconnecting means comprises a second fuse.

19. The system of claim 17, wherein at least one of the first system and the second system comprises a computer system with at least one processor and at least one memory.

20. The system of claim 17, further comprising an auxiliary stage configured to receive regulated voltage as an input from the primary stage and output a regulated auxiliary voltage to the first system and the second system such that the first system and the second system receive auxiliary power independent of the first and second regulators.

* * * * *